March 23, 1965     H. J. FINDLEY     3,174,404
METHOD AND APPARATUS FOR CUTTING MATERIAL
Filed June 15, 1959     8 Sheets-Sheet 1

INVENTOR.
HOWARD J. FINDLEY
BY Hudson, Boughton,
Williams, David & Hoffmann
ATTORNEYS INVENTOR.
HOWARD J. FINDLEY
BY Hudson, Boughton,
Williams, David & Hoffmann
ATTORNEYS March 23, 1965 — H. J. FINDLEY — 3,174,404
METHOD AND APPARATUS FOR CUTTING MATERIAL
Filed June 15, 1959 — 8 Sheets-Sheet 3
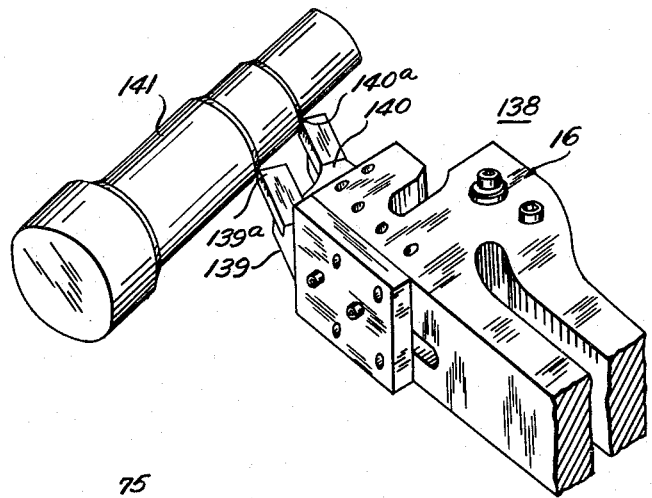
FIG. 16
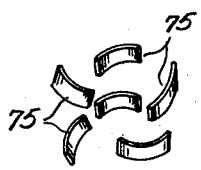
FIG. 6
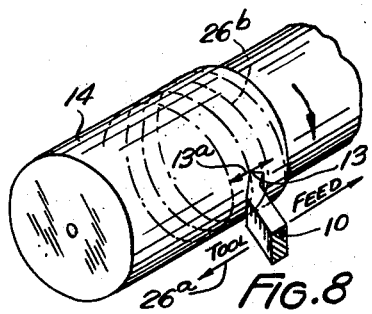
FIG. 8
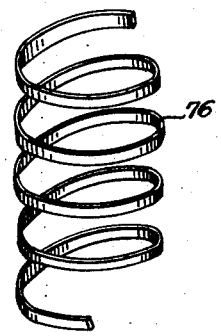
FIG. 7
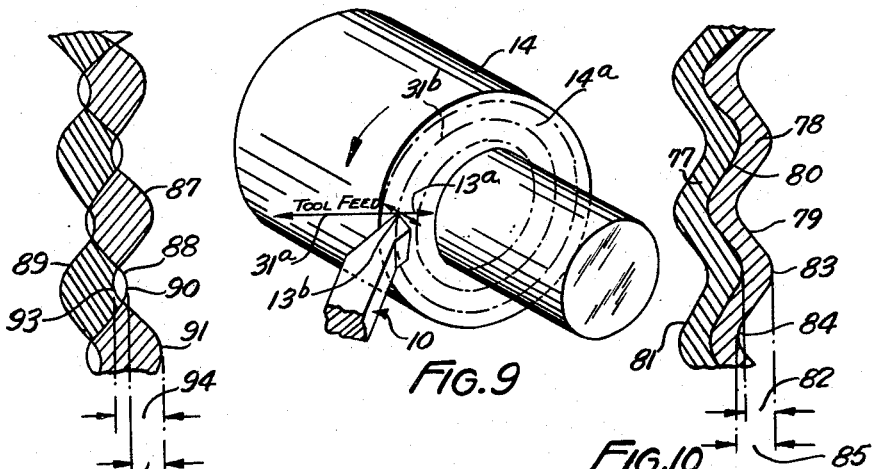
FIG. 9
FIG. 10
FIG. 11
INVENTOR.
HOWARD J. FINDLEY
BY
ATTORNEYS

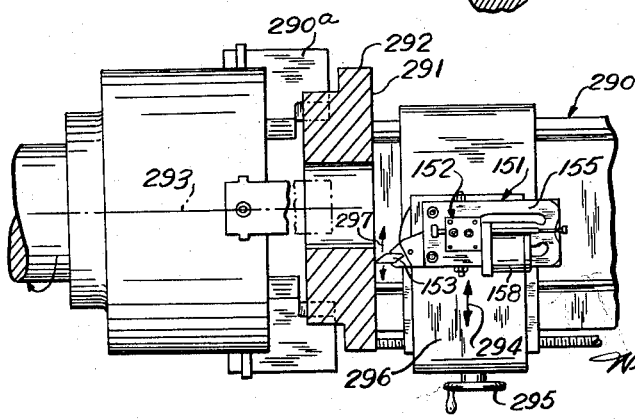

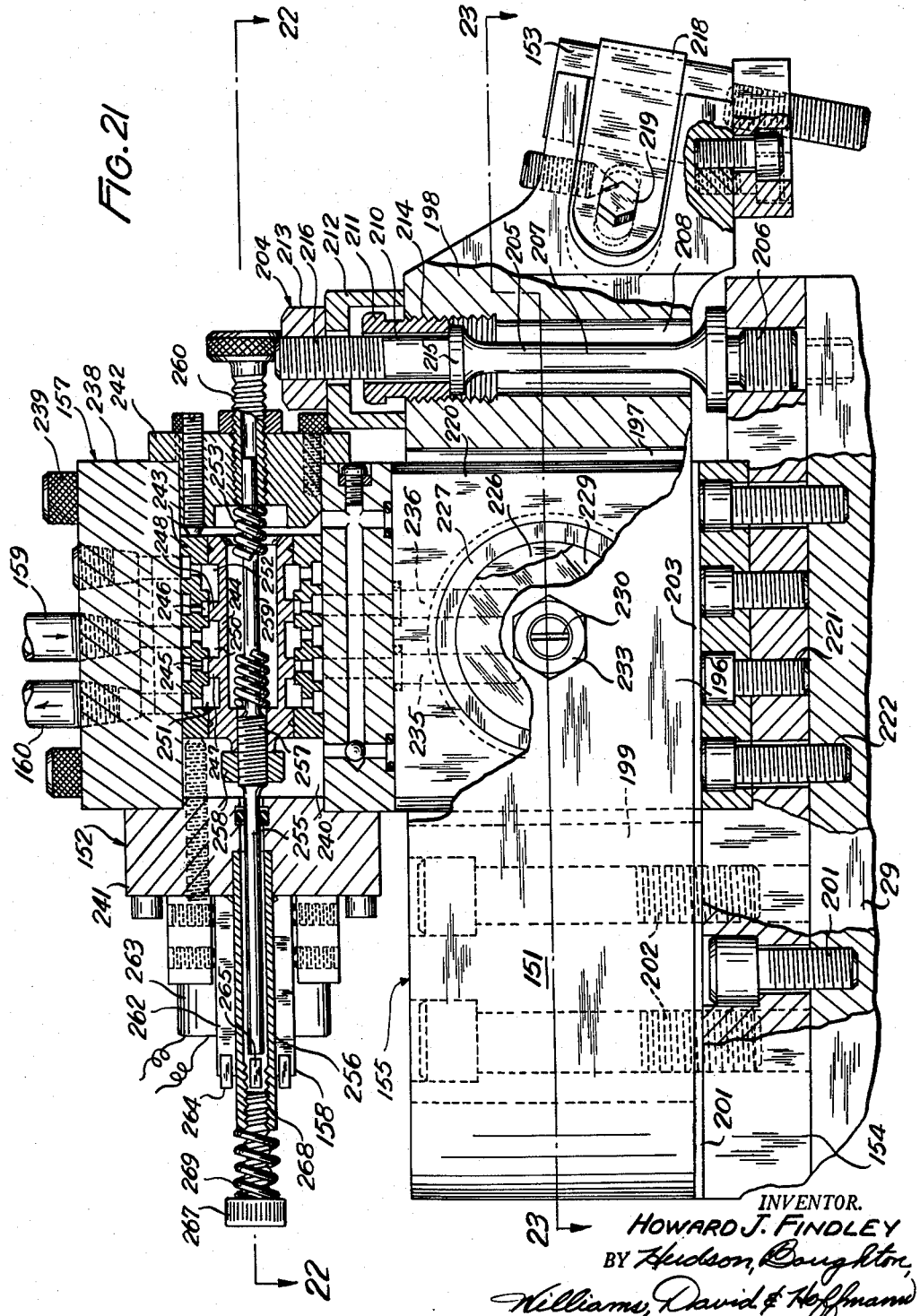

March 23, 1965 H. J. FINDLEY 3,174,404
METHOD AND APPARATUS FOR CUTTING MATERIAL
Filed June 15, 1959 8 Sheets-Sheet 6

INVENTOR.
HOWARD J. FINDLEY
BY Hudson, Coughton
Williams, David & Hoffman
ATTORNEYS March 23, 1965 H. J. FINDLEY 3,174,404
METHOD AND APPARATUS FOR CUTTING MATERIAL
Filed June 15, 1959 8 Sheets-Sheet 7

INVENTOR.
HOWARD J. FINDLEY
BY
ATTORNEYS

March 23, 1965 H. J. FINDLEY 3,174,404
METHOD AND APPARATUS FOR CUTTING MATERIAL
Filed June 15, 1959 8 Sheets-Sheet 8

INVENTOR.
HOWARD J. FINDLEY
BY Hudson, Boughton,
Williams, David & Hoffmann
ATTORNEYS

United States Patent Office 3,174,404
Patented Mar. 23, 1965

3,174,404
METHOD AND APPARATUS FOR CUTTING
MATERIAL
Howard J. Findley, Cleveland, Ohio, assignor to Textron
Inc., Providence, R.I., a corporation of Rhode Island
Filed June 15, 1959, Ser. No. 820,499
10 Claims. (Cl. 90—24)

This invention relates to the removal of material from workpieces by cutting or machining or other such procedures and, as one of its objects, provides a novel method and apparatus by which the removal can be accomplished more rapidly and with a lower power consumption and a correspondingly longer tool life than hertofore, and the use of which method and apparatus will result in the formation of cuttings or chips of a small size and broken character adapted to be readily collected and not likely to cause personal injury.

Another object is to provide a novel method and apparatus for the removal of material from a workpiece by relatively moving the workpiece and a cutting tool in engagement therewith to cause cutting of the workpiece along a cutting path traversed by the tool, and vibrating the tool in a direction transverse to such path during the cutting movement.

Still another object is to provide a novel toolholder and method for use in the removal of material from a workpiece and by which a tool mounted in a vibratory support or toolhead is adapted to be vibrated while in cutting engagement with a workpiece and the vibratory movement varied during the cutting operation for variably controlling the results produced.

A further object is to provide a novel method and apparatus for the removal of material from a workpiece by the use of a tool which is vibrated while in cutting engagement with the work and whose frequency of vibration or amplitude of vibration, or both, are controlled or varied during the cutting operation for achieving different desired results with respect to the shape, form or surface characteristics of the workpiece being cut, or with respect to chip formation or other factors, the variation or control of the tool vibration being accomplished in various ways including variation of the wave form of the power input to a vibration generating means with which the tool is operably associated.

Yet another object is to provide a novel vibratory toolholder, for supporting and vibrating a cutting tool while in cutting engagement with a workpiece, comprising flexible means and vibration generating means operably effective on the flexible means to produce the vibratory movement of the toolholder and tool.

Additionally, this invention provides a novel method and apparatus for machining workpieces as by turning, planing, shaping or the like and involving the use of a cutting tool supported by a vibratory toolholder as, for example, a toolholder of a yoke or forked type, and means for varying the frequency and/or amplitude of the tool vibration.

Other objects and advantages of this invention will be apparent in the following detailed description and in the accompanying drawings forming a part of this specification and in which FIG. 1 is a perspective view showing the novel method being used in turning a workpiece, and also showing novel apparatus which can be used to advantage in carrying out the method;

FIG. 3 is a plan view showing the toolhead and tool bit as a subassembly and in a detached relation;

FIG. 4 is a fragmentary elevation further illustrating the program cam which actuates a pressure fluid control valve of the apparatus of FIG. 1;

FIG. 5 is a sectional elevation taken through the pressure fluid control valve of FIG. 1;

FIG. 6 is a view showing cuttings of the character resulting from the use of the method and apparatus of this invention;

FIG. 7 is a view showing a conventional form of cutting which results from a machining operation carried out with the apparatus of FIG. 1 when the tool is not being subjected to the vibratory movement;

FIG. 8 is a diagrammatic view showing the direction of tool vibration in relation to the cutting path traversed by the cutting tool when the apparatus of FIG. 1 is being operated with a longitudinal feed for the tool;

FIG. 9 is a similar diagrammatic view illustrating the condition when the apparatus of FIG. 1 is being operated with a transverse feed for the tool;

FIGS. 10 and 11 are comparative diagrams graphically illustrating in-phase and out-of-phase conditions for the vibratory movement of the tool;

FIG. 16 is a partial perspective view showing a further modified form of the apparatus wherein the vibratory toolhead carries a plurality of cutting tools;

FIG. 17 is a diagrammatic view, mainly in elevation, showing a vibratory toolholder provided with electrohydraulic means for producing the vibratory movement at a frequency corresponding with that of an alternating current supply;

FIG. 18 is a similar diagrammatic view but showing the vibration frequency of the tool determined by the pulse frequency of a supply of pulsating direct current;

FIG. 19 is another such diagrammatic view showing electrically controlled means for varying the vibration frequency of the tool as desired;

FIG. 20 is a plan view of a diagrammatic form showing electric-signal-controlled means for varying the tool vibration in accordance with certain conditions or needs pertaining to the machining operation being performed;

FIG. 21 is an elevational view, with portions in section, further illustrating an electrohydraulic vibratory toolholder of the kind shown in the diagrammatic views of FIGS. 17 to 20 inclusive;

FIG. 24 is a plan view of a somewhat diagrammatic form showing the direction of tool vibration in relation to the path of the cutting movement when a vibratory toolholder of the kind shown in FIGS. 17 to 23 inclusive is being used to machine an end face or shoulder portion of a workpiece;

Figure 1:
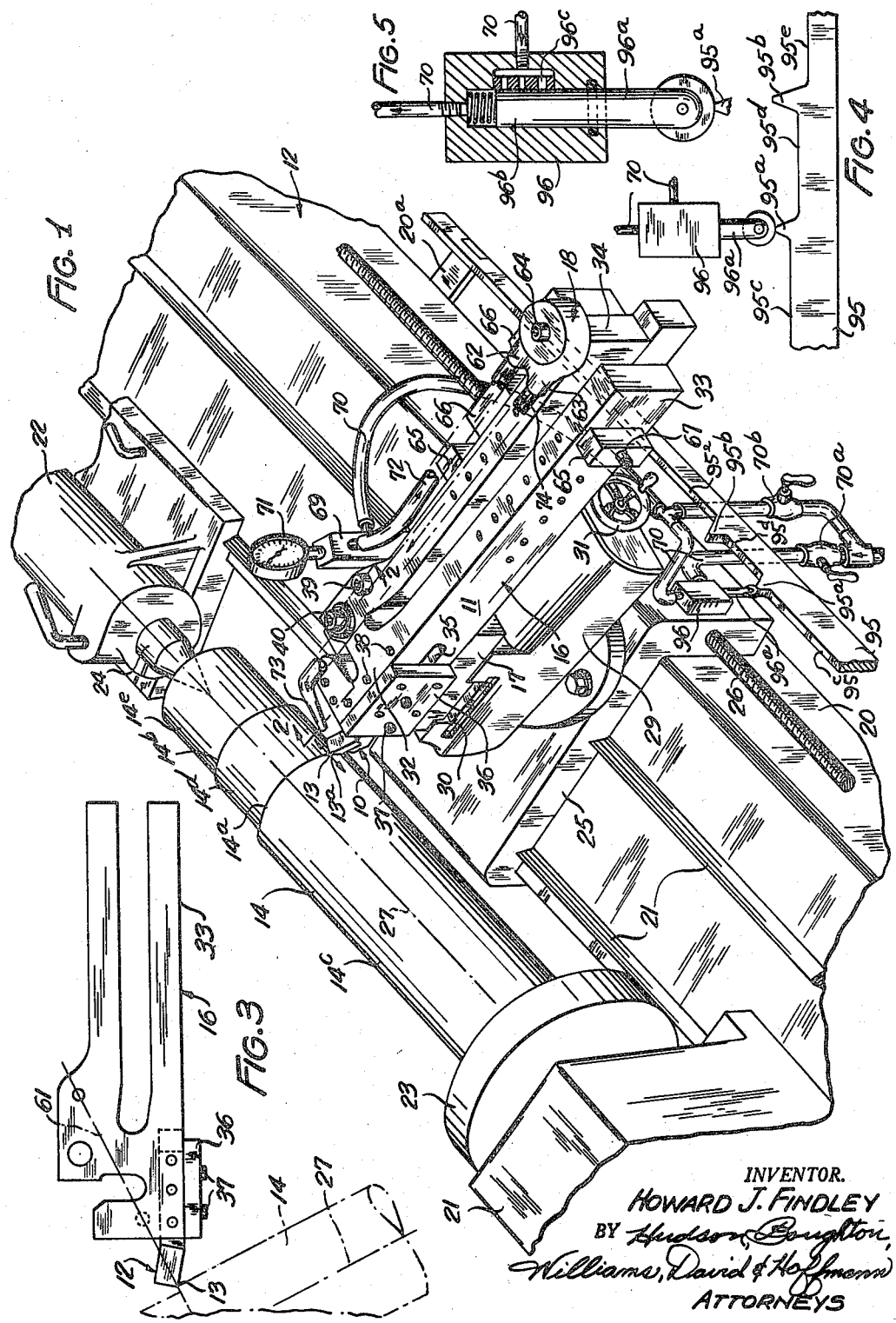

The method and apparatus of this invention provide for the removal of material from a workpiece by cutting or machining, or other such procedures, by the use of a vibratory cutting tool 10 here shown as forming a part of a toolholder unit 11. By way of example the method and apparatus are illustrated in FIG. 1 as being used in conjunction with a lathe 12 and the rotative type of machining performed thereby. The toolholder unit 11 supports the cutting tool or tool bit 10 with the cutting tip 13 thereof in engagement with a rotatable workpiece 14.

The toolholder unit 11 comprises, in general, a vibratory holder member or head 16 flexibly connected with a support means or base 17 and supporting the tool 10, and a vibration generator or exciter 18 operatively associated with such head.

The lathe 12 comprises a frame 20 having ways 21 thereon and also includes a head stock 21 and a tail stock 22. The head stock and tail stock are provided with the usual members 23 and 24 for supporting and rotating the workpiece 14 while in engagement with the tool 10. The lathe 12 also comprises a carriage 25 movable on the ways 21 by means of an associated lead screw 26 for producing a translatory or longitudinal feeding movement of the tool 10 along a path parallel to the rotation axis 27 of the workpiece.

The lathe 12 is also provided with a conventional compound slide unit 29 suitably mounted on the carriage 25 and having a T-slot 30 for receiving a portion of the toolholder base 17. The compound slide unit 29 embodies the usual means by which the tool 10 can be swung relative to the workpiece 14, and the usual transverse feeding means actuatable by a handwheel 31 by which an in-and-out feed movement can be imparted to the tool 10 in a direction generally transverse to the rotation axis 27.

The head 16 is of a form which will enable it and the tool 10 to be vibrated during the cutting of the workpiece 14 and is here shown as being a yoke-shaped member or fork having a tool mount portion 32 and a pair of spaced parallel arms 33 and 34 projecting from such mount portion and extending in a general direction away from the tool 10 and the workpiece 14. The arms 33 and 34 are resilient and are capable of vibratory movement in the manner of the arms of a conventional tuning fork.

The mount portion 32 can be of any suitable shape appropriate for the transmission of vibratory movement to the tool 10 and is suitably adapted for the mounting of the tool thereon. The tool 10 is here shown as being a conventional form of turning tool having a substantially rigid stem 10a on which the cutting tip 13 is formed or mounted. The mount portion 32 preferably has a slot 35 therein in which the stem 10a of the tool is received and suitably clamped. For thus securing the tool stem in the slot 35, the mount portion 32 is provided with an attached cover plate 36 overlying the slot 35 and having suitable clamping screws 37 engageable with the tool stem. Additional tool clamping screws 38 are provided in the mount portion 32 for engagement with the tool stem 10a.

The mount portion 32 also forms an attaching portion for attachment of the head 16 to the base 17 in a manner to provide for the vibratory movement of the tool 10 by permitting a limited movement of the mount portion 32 relative to the base. For this purpose, clamping screws or the like, 39 and 40, are provided and extend through the mount portion 32 and have their inner or lower ends engaged in threaded openings 41 provided in the base 17 (see FIG. 2). The screw 39 provides a relatively solid or rigid connection with the base 17 for one point of the mount portion 32 and can be referred to as a full clamping screw. The screw 40 and co-operating members associated therewith provide a flexible connection or floating suspension 42 between the mount portion 32 and the base 17.

The mount portion 32 is preferably separated from the base 17 somewhat by an intervening space or slot 43 obtained by the use therebetween of a suitable spacer or shim 44 of appropriate material. The spacer 44 is interposed between the mount portion 32 and the base 17 by being located in a surrounding relation to the full clamping screw 39.

The vibratory character of the toolholder unit 11 and the head 16 is such that this unit or member has a resonant vibration frequency or various resonant vibration frequencies. During a cutting operation being performed by the tool 10 the head 16 can be vibrated at a resonant frequency or at a non-resonant frequency, depending upon the material removal results desired to be achieved. Usually, however, the vibration frequency of the tool 10 will be near, or will variably straddle, a resonant frequency of the unit or head.

The head 16 also has a nodal area or neutral point which lies within the area of the mount portion 32 and is the area or point at which the full clamping screw 39 is located. This nodal point is the point of the head 16 at which a minimum amount of motion occurs when the head is being vibrated and is, therefore, the point at which the clamping of the head against the base 17 will have minimum retarding or damping effect on the vibratory movement of the head and tool.

For the purpose of establishing the floating suspension 42 referred to above, the screw 40 extends through an opening 46 provided in the mount portion 32 and which is substantially larger than the diameter of this screw. The floating character of the suspension is obtained by the co-operative action of a clamping socket 47 and a spacer sleeve 48 which are located in a surrounding relation to the screw 40.

The socket member 47 has a cylinderical hollow body 47a slidably inserted into the opening 46 and is of a length so that the end wall 49 thereof is located just inwardly of or below the upper end of the opening 46. The socket member 47 is provided at the lower end thereof with an out-turned flange 50 which engages the lower face of the mount portion 32 in surrounding relation to the opening 46 for limiting the extent to which this member is movable into this opening and for also taking the downward thrust of the mount portion.

The floating suspension 42 also comprises a relatively thick and rigid washer 51 surrounding the stem of the screw 40 and engaged by the underside of the head 40 thereof. The washer 51 spans the upper end of the opening 46 and enables the screw 40 to apply downward clamping thrust to the mount portion 32. The spacer 48 is an open-ended sleeve telescoped into the socket member 47 and having its upper end engaged with the end wall 49 of the latter. The lower end of the spacer 48 bears against the upper surface of the base 17.

From the construction just described for the floating suspension 42 provided by the screw 40 and the members associated therewith, it will be seen that this suspension assists the full clamping screw 39 in connecting the mount portion 32 with the base 17 without preventing or damping the vibratory movement of the head 16 relative to the base.

Figure 2:
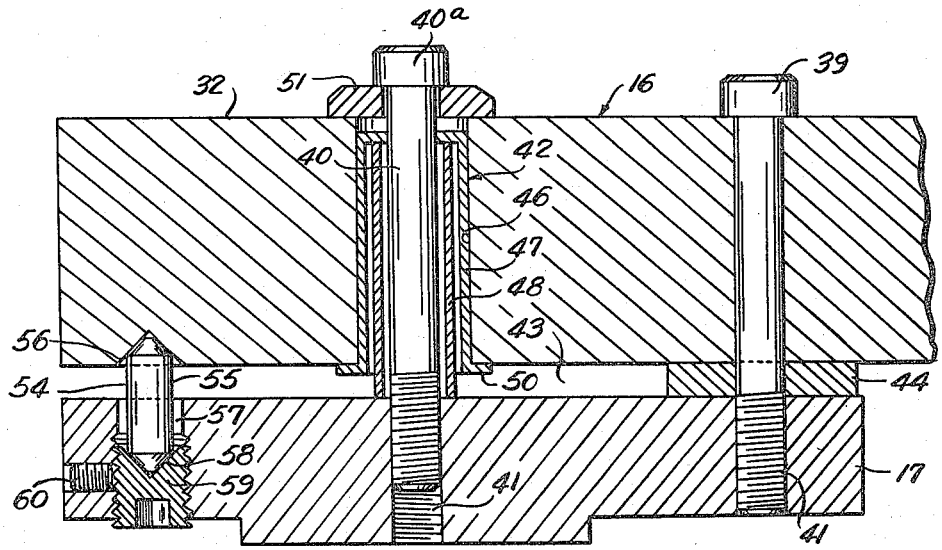
FIG. 2 is a vertical section taken through the apparatus of FIG. 1, as indicated by the irregular section line 2—2 thereof, and showing the flexible connection of the toolhead with a support means.

As shown in FIGS. 2 and 3, the tool mount portion 32 of the head 16 is in a spaced and overhanging relation to a substantial portion of the base 17 and, to prevent undue deflection of this overhanging portion by the downward thrust of the tool 10, an auxiliary support means 54 is provided between the mount portion and base at a point spaced from the connections provided by the screws 39 and 40. This auxiliary support means is located at a point adjacent the tool 10 and is here shown as comprising a thrust pin 55 tiltably interposed between the mount portion 32 and the base 17 and having its ends received in recesses 56 and 57 of such yoke and base.

The upper end of the pin 55 is of a shape conforming substantially with the shape of the recess or socket 56 and is solidly but rockably seated therein. The lower end of the pin 55 is solidly but rockably seated in a socket 58 provided in an adjusting screw 59. The screw 59 is adjustably movable in a threaded lower portion of the recess 57 for suitably varying the seating of the pin 55 in the sockets 56 and 58, and is adapted to be secured in the desired position of adjustment by a set screw 60.

FIG. 3 of the drawings shows the true relative locations, in plan view, for the connecting screws 39 and 40, the rockable support pin 55, and the cutting tip 13. As shown in this view the axis of the full clamping screw 39, the axis of the support pin 55, and the cutting tip 13 all lie on or adjacent a straight line 61. Although FIGS. 1 and 3 show the tool 10 extending in a direction which is generally transverse to the rotation axis 14, the tool may be disposed with its longitudinal axis inclined to the rotation axis as shown in FIG. 3.

The vibration generating device or exciter 18 is a transducer of any suitable type and is shown in FIG. 1 as being a pressure fluid operated device or motor having a fluid pressure inlet 62 and an exhaust fluid outlet 63. The vibration generator 18 can be a conventional form of vibratory fluid motor device and may, for example, be a compressed air operated unbalanced gyratory or whistle type of device embodying a rotor means having a rotative or gyratory annular movement about a rotation axis. The generator 18 is solidly secured to the head 16 as by a clamping screw 64.

As shown in FIG. 1, the vibration generator 18 is disposed with its rotation axis extending in a vertical direction, that is, substantially perpendicular to a horizontal plane which extends through the head 16 and the cutting tip 13 of the tool and, for convenience, can be referred to as the vibration plane. The rotation axis of the generator 18 is the same as the axis of the attaching screw 64. The generator can assume various other forms and can be connected to the head 16 in various other ways, as will be further explained hereinafter, but in FIG. 1 is shown as being mounted on the arm 34 adjacent the free end thereof.

When the vibration generator 18 is connected with the head 16 in the manner and relative location shown in FIG. 1 and just described above, the operation of this device by fluid pressure of a suitable pressure value supplied thereto, in this case compressed air, will generate vibrations of a suitable frequency and will deliver the same to the head 16 to vibrate the latter in an adjustable range of frequencies lying close to or straddling a resonant frequency thereof. In accomplishing this purpose, the generator 18 applies a vibration force to the arm 34 with the major component of such force acting in the horizontal vibration plane referred to above so that the head will be set in vibration and will continue to vibrate as long as the exciter is being driven by proper motive fluid supplied thereto. In the apparatus of FIG. 1 the direction of the vibratory movement thus supplied to the tool tip 13 is indicated by the arrow 13a and is transverse to the axis of the stem of the tool 10 and parallel to the rotation axis 14.

The phase characteristic of the vibratory movement produced by the generator 18 is preferably such that a transfer of a maximum amount of the available vibration energy will take place from the generator to the head. The vibration energy absorption capabilities of the head 16 are in excess of the power output capabilities of the generator, and hence, the generator will be prevented from operating at a speed greater than that corresponding with the resonant frequency of the head. The resulting tendency will be for the generator 18 to operate at a speed corresponding with a resonant frequency of the head 16 and at which a maximum energy transfer to the head will take place.

For varying the vibration characteristics of the arms 33 and 34 and the resonant frequency of the head 16 of which they form a part, suitable adjusting masses are provided on the arms in the form of control weights 65 and 66. These weights can be secured to the arms 33 and 34 at different desired points therealong as by suitable attaching screws 67. The weights 65 and 66 vary the vibrational characteristics of the arms in accordance with the positions of the weights therealong, and also influence the vibratory action of the head 16 with respect to the location of the nodal point thereof so that the position of this point can be definitely established as the location for the full clamping screw 39.

Pressure fluid for operating the generator 18 is supplied to a manifold 69, provided on the base 17, through a supply conduit 70. The pressure of the supply fluid is visibly indicated by a suitable indicator gauge 71 mounted on the manifold 69. The supply fluid is delivered into the inlet 62 of the generator 18 through a light-weight flexible conduit 72 extending thereto from the manifold 69, such as a compliant conduit made of suitable plastic tubing or the like.

In accordance with one of the features of the present invention, the exhaust fluid from the vibration generator 18 is preferably used to cool the tool 10 and, for this purpose, is delivered toward or against the cutting tip 13 by a delivery nozzle 73. The nozzle 73 is suitably supported on or adjacent the mount portion 32 of the head 16 and is connected with the exhaust outlet 63 of the exciter by a suitable conduit 74.

During the use of the toolholder unit 11 and the method of this invention in machining operations the head 16, and consequently the cutting tip 13, is vibrated at a desired frequency in the manner explained above by the operation of the vibration generator 18, and the occurrence of such vibratory movement of the tip during the cutting operation on the workpiece 14 results in the production of cuttings in the form of broken or individual chips 75 as shown in FIG. 6. Chips of this kind can be more readily handled and collected with less likelihood of personal injury than the cuttings of continuous-length or spiral-strip form heretofore produced during conventional machining operations. FIG. 7 shows such a continuous-length or spiral-strip form of cutting 76 for purposes of comparison with the chips 75 of FIG. 6.

The carriage 25 and the compound slide unit 29 of the lathe 12 provide the two feeding movements referred to above for the tool 10, namely a longitudinal translatory feeding movement of the tool which is parallel to or along the rotation axis 27, and an in-and-out or transverse feeding movement toward and away from the rotation axis.

In the operation of the toolholder unit 11 of FIG. 1, the vibratory movement of the tool tip 13 takes place in the horizontal vibration plane and is a rapid short-stroke reciprocatory movement of the tip relative to the workpiece 14 and in a direction transverse to the path of the cutting movement, as represented by the arrow 13a. This vibratory movement of the tool tip 13 is also a swinging movement in the horizontal vibration plane and about the axis of the full clamping screw 39 as a fulcrum but since the movement has a very short stroke the directional arrow 13a is shown as being a straight line.

The diagrams of FIGS. 8 and 9 further illustrate the direction of the vibratory movement of the tool 10 relative to the path of the cutting movement. Thus when the tool 10 is in cutting engagement with the rotating workpiece 14 and is being advanced by a longitudinal feeding movement along or represented by the feed arrow 26a, the path of the cutting movement will be a helical path as represented in exaggerated form by the line 26b. Since the vibratory movement of the tool 10, as produced by the vibration of the head 16, is in the horizontal plane and transverse to the axis of the cutting tool itself as explained above, it will be in a direction transverse to the path of the cutting movement as represented by the arrow 13a.

When the tool 10 is in cutting engagement with a shoulder portion or face 14a of the rotating workpiece, as shown in FIG. 9, and the tool is being advanced with a transverse feeding movement in an in-and-out direction along or represented by the feed arrow 31a, the path of the cutting movement will be a spiral path as represented in exaggerated form by the line 31b. The vibratory movement imparted to the tool by the head 16 and represented by the arrow 13a will accordingly be in a direction transverse to the path of the cutting movement.

In the vibratory cutting procedure of this invention, the phase relation of the vibratory movement of the cutting tip 13 during successive cuts and the vibration frequency of the tip relative to the movement of the workpiece 14 are important for the production of cuttings in the form of broken or individual chips such as the chips 75 of FIG. 5. These relationships can be explained to advantage by referring to the diagrams of FIGS. 10 and 11, which are comparative diagrams, FIG. 10 illustrating an in-phase vibration of the cutting tool which is relatively ineffective for chip-breaking purposes and FIG. 11 illustrating the out-of-phase tool vibration provided by this invention and which is highly effective in chip-breaking. FIG. 10 also illustrates the condition existing when the vibration frequency of the tool 10 is equal to, or closely approximates, the product of the rotation speed of the workpiece 14 and a given integer, whereas FIG. 11 illustrates the condition existing when the vibration frequency of the tool is equal to or closely approximates the product of the rotation speed of the workpiece and said integer $+\frac{1}{2}$.

The diagram of FIG. 10 graphically represents two successive cuts 77 and 78 produced by the tool tip 13 while the tool 10 is being vibrated at a frequency, in relation to the workpiece rotation, at which the cutting paths of the tip during such successive cuts have an in-phase relation to each other. The line or curve 79 represents the theoretical undulatory cutting path of the vibrating tool tip 13 against the workpiece 14 during a given or Nth revolution of the workpiece. The undulatory line or curve 80 represents the theoretical cutting path of the vibrating tool tip 13 during the Nth+1 revolution of the workpiece. Similarly, the undulatory line or curve 81 represents the theoretical cutting path of the vibrating tool tip 13 during the Nth+2 revolution of the workpiece.

The width of the space between the parallel or coextending undulatory curves 79 and 80 and designated by the dimensional distance 82 represents the feed movement of the tool tip per revolution of the workpiece 14, in this case, the above-mentioned translatory or longitudinal feed movement in a direction parallel to the rotation axis 27. The distance between two adjacent crests 83 and 84 of the curve 79 and indicated by the dimensional distance 85 represents the total amplitude of the vibratory movement of the tool tip 13. Because of the fact that the cutting paths 79, 80 and 81 of the tool tip 13 during the successive cuts are coextensive or parallel, the cuttings resulting from the machining operation represented by FIG. 10 will be strip-type cuttings such as the cutting or chip 76 illustrated in FIG. 7.

FIG. 11 of the drawings graphically illustrates the vibratory cutting procedure of this invention in which the vibratory movement of the tool tip 13 is in the above-mentioned out-of-phase relation during successive cuts and by which broken or individual chips, such as the chips 75 of FIG. 6, are effectively produced. The undulatory line or curve 87 represents the cutting path of the tool tip 13 during a given or Nth revolution of the workpiece 14, and the undulatory curves 88 and 89 represent the cutting paths followed by the tool tip during the Nth+1 and Nth+2 revolutions, respectively, of the workpiece. The maximum distance between the two adjacent curves 87 and 88 and indicated by the dimensional distance 92 represents the total feed movement of the tool 10 per revolution of the workpiece 14. The distance between two adjacent crests 91 and 93 of the curve 87 and indicated by the dimensional distance 94 represents the total amplitude of the vibratory movement of the tool tip 13.

In the cutting procedure provided by this invention and illustrated in FIG. 11 it will accordingly be seen that curves 87, 88 and 89 will have the above-mentioned out-of-phase or intersecting relation which is representative of the fact that the depth of the cut being made by the tool tip 13 is being repeatedly varied so that the resulting cuttings will be of an interrupted or chip-like form such as that of the chips 75 illustrated in FIG. 6.

When the vibratory cutting method and apparatus of this invention are applied to a workpiece having axially spaced shoulder portions, such as to the workpiece 14 of FIG. 1 having the axially spaced shoulder portions 14a and 14b, it may be desirable to automatically detect the arrival of the tool tip 13 at these shoulders and to thereupon terminate or interrupt the vibration of the tool 10 while it is in engagement with, or operating on, such shoulder portions. It may also be desirable to vary the vibratory action of the tool 10 in accordance with the shapes or sizes of the workpiece portions being traversed and cut by the tool. Thus when the workpiece 14 has portions of different shapes or sizes, such as the different diameter portions 14c, 14d and 14e, a different vibratory action for the tool 10 is desired when it is operating on these different portions.

For these purposes the lathe 12 is provided with a program cam presenting an indicating and control pattern and represented by a cam bar 95 which is detachably mounted on the frame 20 as by means of suitable brackets 20a. The lathe 12 is also provided with control means controlling the vibration generator and responsive to the indicating and control pattern, in this case, a control valve 96 operated by the cam bar 95 controlling the supply of pressure fluid to the vibration generator 18. The cam bar 95 can have any desired profile appropriate for the workpiece being cut or machined and, in this case, has cut-off cam lobes 95a and 95b spaced apart in the direction of longitudinal feed of the tool 10 and to correspond with the spacing of the shoulders 14a and 14b of the workpiece 14. The cam bar 95 also has longitudinal dwell portions 95c, 95d and 95e corresponding as to location and length with the different diameter workpiece portions 14c, 14d and 14e, the dwell portions 95c and 95d being contiguous to and separated by the cut-off lobe 95a and the dwell portions 95d and 95e being contiguous to and separated by the cut-off lobe 95b. As shown in FIG. 4, cut-off lobes 95a and 95b are of the same height but the dwell portions 95c, 95d and 95e are of different heights corresponding with the variations in the diameters of the workpiece portions 14c, 14d and 14e.

The control valve 96 is mounted on the carriage 25 for movement therewith and is located in the pressure fluid supply line 70 of the vibration generator 18. This valve is of a suitable construction and is here shown as having an actuating stem 96 projecting therefrom and carrying a roller for cooperation with the cam lobes and dwell portions of the cam bar 95. As shown in FIG. 5, the valve 96 has a valve element 96b formed by the inner end portion of the stem 96a and shiftable thereby in opposition to a compression spring for controlling a plurality of pressure fluid supply ports 96c.

When the tool 10 arrives at one of the shoulder portions of the workpiece 14 such as the shoulder portion 14a, the stem 96a will be in engagement with the corresponding cam lobe 95a and the valve element 96b will be actuated to the position shown in FIG. 5 thus closing all the ports 96ᶜ and causing the pressure fluid supply to the generator 18 to be interrupted to stop the vibration of the tool 10. Similarly, when the tool 10 is at the shoulder portion 14ᵇ, the stem 96ᵃ will be on the cam lobe 95ᵇ to again cause closing of all the ports 96ᶜ and stopping of the vibration generator 18. The cam lobes 95ᵃ and 95ᵇ are of a length and contour suitable for the shoulder portions of the workpiece and provide for a resumption of the fluid pressure supply to the generator 18 when the stem 96ᵃ moves off of the cam lobe engaged thereby.

When the valve stem 96ᵃ is in cooperation with the dwell portion 95ᶜ only one of the ports of the valve 96 will be uncovered by the valve element 96ᵇ, but when the valve stem cooperates with the dwell portion 95ᵈ two of the ports will be uncovered, and likewise, when the valve stem cooperates with the dwell portion 95ᵉ all three of the ports will be uncovered. The pressure of the motive fluid supply to the generator 18 will vary in accordance with whether one, two or three of the ports 96ᶜ are uncovered by the valve element 96ᵇ, and hence, the vibration frequency or amplitude, or both, of the vibratory movement imparted to the tool 10 by the operation of the vibration generator will be automatically varied by the different extents of actuation of the valve 96 by the cam bar 95.

It will accordingly be seen that as the machining of the workpiece 14 progresses and the tool 10 is operating on the large diameter workpiece portion 14ᶜ the position of the valve element 96ᶜ, as determined by the corresponding dwell portion 95ᶜ, will be to uncover one of the ports 96ᶜ. The pressure of the fluid supply to the generator 18 will then be relatively low and only sufficient to cause a desired low frequency or low amplitude, or both, for the vibratory movement of the tool 10. When the tool 10 is operating on the small diameter portion 14ᵉ of the workpiece and the position of the valve element 96ᵇ, as determined by the corresponding dwell portion 95ᵉ, will be to uncover all three of the ports 96ᶜ to supply a relatively high pressure valve of motive fluid to the generator 18 for producing a desired high frequency or high amplitude, or both, for the vibratory movement of the tool. When the tool 10 is operating on the workpiece 14ᵈ of intermediate diameter the position of the valve element, as determined by the intermediate dwell portion 95ᵈ, will be to uncover two of the ports 96ᶜ and the pressure of the motive fluid supply to the generator 18 will then be such as to produce a desired intermediate frequency or amplitude, or both, for the vibratory movement of the tool.

The vibration of the tool 10 can also be interrupted, as desired, for any or various portions of the cutting operation by the closing of a shut-off valve 70ᵃ located in the air supply conduit 70 and here shown as being a manually operable valve. On the other hand, it may be desirable in many cases to vibrate the tool 10 during a cutting operation but without having the operation of the vibration generator 18 affected by the automatic actuation of the control valve 96 by the cam bar 95. This is accomplished by the provision of a by-pass valve 70ᵇ by which the motive fluid or compressed air can be supplied to the generator 18 independently of the control exercised by the cam bar 95.

FIGS. 12 to 15 inclusive of the drawings show various other kinds of exciters or vibration generators for producing the vibratory movement of the head 16 and these views accordingly illustrate modified forms of toolholder units 97, 98, 99 and 100 which, in other respects, are the same as the toolholder unit 11.

Figure 12:
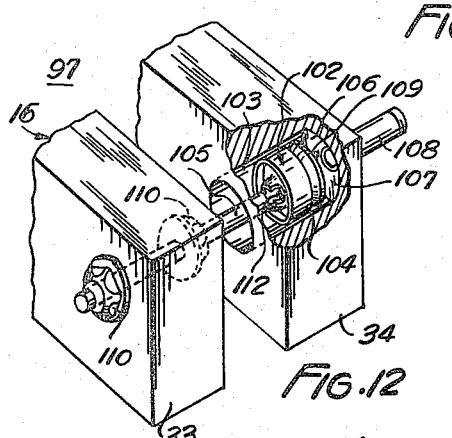
FIG. 12 is a partial perspective view showing a portion of a fork-type vibratory toolhead and representing a modified form of the apparatus wherein the vibration generating means is responsive to pressure fluid pulsations.

In the modified toolholder unit 97 of FIG. 12, the vibration generator 102 is operably connected between the spaced arms 33 and 34 of the head 16 and is a pressure fluid pulsation responsive device. The generator 102 comprises a cylinder 103, connected with or formed in the arm 34, and a plunger 104 slidable in the cylinder and connected with the arm 33 by a piston rod or link 105 extending through the latter arm. The plunger 104 co-operates with an end wall 106 of the cylinder 103 to form a pressure chamber 107 to which pulsating pressure fluid, preferably hydraulic fluid, is supplied through a conduit 108. The plunger 104 is provided with a suitable packing 109 for sealing co-operation with the wall of the cylinder 103.

The piston rod or link 105 is connected with the arm 33 by means of clamping members or nuts 110 provided on the rod and engaging the opposite side faces of this arm. The rod 105 is flexible in character, or is rendered flexible by having an end thereof attached to the plunger 104 as by means of a ball and socket type of connection 112.

Rapid pressure pulsations in the fluid being supplied to the cylinder 103 are effective against the plunger 104 and produce rapid vibrations of the arms 33 and 34 which are transmitted through the head 16 to the cutting tool for vibrating the latter.

An important feature of the toolholder unit 97 of FIG. 12 is that the vibration generator 102 is operably connected between the flexible portions or arms 33 and 34 of the head 16, and consequently, the generator can be operated to vibrate the head in a positive manner and at any desired frequency which may be a resonant frequency or a nonresonant frequency.

Figure 13:
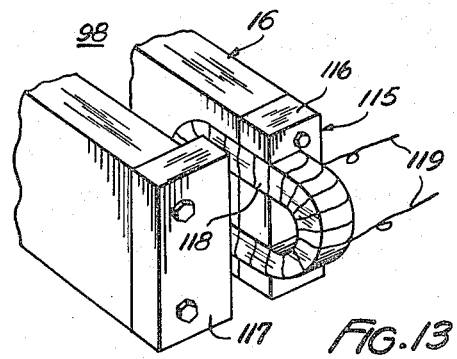
FIGS. 13, 14 and 15 are similar perspective views showing other modified forms of the apparatus and in all of which the vibration generating means is electrically operated.

In the modified toolholder unit 98 of FIG. 13 an electromagnetic or solenoid form of vibration generator 115 is provided for vibrating the head 16 and comprises a field core 116 and a co-operating armature member 117 movably responsive to variations in the magnetization of the core. An energizing coil 118 is provided for the core 116 and has leads 119 for connecting the same with a suitable source of electrical energizing current, preferably a variable frequency current of an alternating or pulsating type.

Rapid variations occurring in the energization of the coil 118 will vary the magnetization of the core 116 and will accordingly produce a corresponding rapid vibratory movement of the armature member 117 toward and away from the core member and by which the head 16 will be set into vibration.

Figure 14:
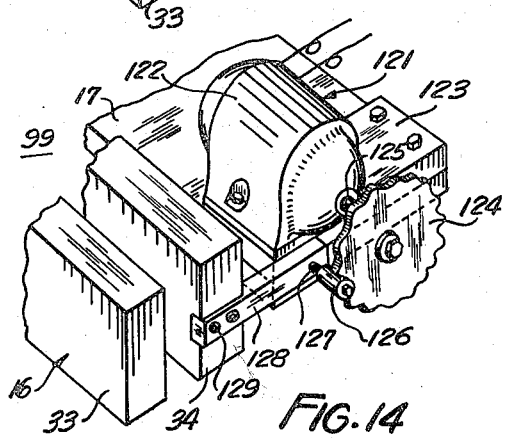

In the modified toolholder unit 99 of FIG. 14 a vibration generator 121 is used which is of a type adapted to generate vibrations mechanically by the operation of an electric motor 122. The motor 122 is mounted on a support 123 which is connected with, or formed as a part of, the base 17 and rotates a cam or star wheel 124 which is mounted on the motor shaft 125. A cam follower in the form of a roller 126 co-operates with the cam 124 and is suitably connected with the arm 34 to cause the head 16 to vibrate.

As here shown, the roller 126 can be mounted on a pivot pin 127 carried by a thrust member 128 projecting from the arm 34 and secured to the latter by connecting screws 129. The resiliency of the arm 34 holds the roller 126 against the periphery of the cam 124 and, during the rotation of the latter, a rapid vibration of the roller will be produced and transmitted to the head 16 and the cutting tool of the latter.

Figure 15:
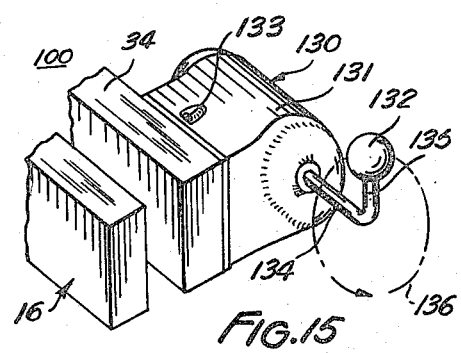

In the modified toolholder unit 100 of FIG. 15 a vibration generator 130 is shown which comprises an electric motor 131 and a weight 132 rotatably driven by the motor in an unbalanced relation. The motor 131 is mounted directly on the arm 34 of the head 16 by means of suitable attaching screws 133 and has a projecting armature shaft 134. The armature shaft 134 has an eccentric or angularly offset arm portion 135 on which the weight 132 is mounted. The weight 132 is here shown as being in the form of a ball and during the operation of the motor 131 moves in a circular path 136 and, by reason of the unbalanced relation of the load being thus driven by the motor, a rapid vibratory movement of the head 16 will be produced.

FIG. 16 of the drawings shows a further modified form of toolholder unit 138 which is provided with a plurality of cutting tools, in this instance two such tools 139 and 140 and which have cutting tips 139a and 140a in vibratory cutting engagement with a workpiece 141. The head 16 of the modified toolholder 138 is of a suitable construction to receive the plurality of cutting tools 139 and 140 but, in other respects, is of the same construction and functions in the same manner as has been described above in connection with the toolholder unit 11.

FIGS. 17 to 20 inclusive of the drawings show the vibratory apparatus and method of this invention applied to the removal of material from a rotatably driven workpiece 150 by the use of a toolholder unit 151 of a form similar to the toolholder unit 11 but which employs an electrohydraulic form of vibration generator 152. The toolholder unit 151 and the electrohydraulic vibration generator 152 thereof will be further described hereinafter but, at this point, it will be sufficient to merely explain that the unit 151 includes a tool or tool bit 153 for cutting engagement with the workpiece 150 and also includes a mounting plate 154 by which this unit is mounted on a suitable feeding means such as the compound slide 29 of the above-described lathe 12.

The unit 151 also comprises a vibratory head 155 containing a hydraulic-pressure-pulsation responsive piston means 156 as a part of the electrohydraulic generator 152. The vibration generator 152 also includes, in addition to the piston means 156, a vibratory valve device 157 and an electromagnet 158 for actuating the vibratory valve device. Hydraulic fluid of a suitable pressure value is supplied to the valve device 157 through a supply conduit 159 and is exhausted therefrom through an exhaust conduit 160.

In the FIG. 17 embodiment of the invention the electromagnet 158 is connected with a source of alternating current of a suitable frequency, such as a 60-cycle frequency, by means of a pair of conductors 162 and the energization of the electromagnet is controlled by a switch 163 located in one of these conductors. During the cutting operation performed by the apparatus of FIG. 17, the tool 153 is vibrated in the same manner and direction as the tool 10 of the workholder unit 11 described above, and achieves the same desirable results in connection with the machining of the workpiece 150.

The rate of vibration of the cutting tool 153 of FIG. 17 will be in accordance with the frequency of the alternating current supplied to the magnet 158 of the valve device 157 and, when the energizing current is a 60-cycle alternating current, the rate of vibration will be 120 oscillations per second. Any desired rate of vibration can be achieved, however, for the tool 153 by suitably selecting the frequency of the alternating current being supplied to the electromagnet 158. Whenever it is desirable to have the tool 153 operate on the workpiece 150 in a conventional manner, that is without the benefit of the vibratory action, this can be achieved by merely disabling the vibration generator 152 as by opening the control switch 163 and, whenever the vibratory action is to be restored, this can be accomplished by merely closing this control switch.

In the FIG. 18 embodiment the same toolholder unit 151 is shown but, in this case, the vibratory movement of the tool 153 is controlled by the use of pulsating direct current in energizing the magnet 158 of the valve device 157 controlling the vibration generator 152. The pulsating direct current for the electromagnet 158 can be a current supplied thereto by conductors 165 connected with a suitable source of alterating current, such as current of 60-cycle frequency, and which is supplied to the magnet through a suitable rectifier device such as a half-wave rectifier 166 located in one of the supply conductors. The use of pulsating direct current supplied by a half-wave rectifier, as here shown, provides a convenient and practical way of obtaining a relatively low vibration frequency for the tool 153.

When the control switch 163 of FIG. 18 is closed, the cutting tool 153 will be vibrated with an oscillation frequency corresponding with that of the frequency of the pulsating direct current being supplied to the magnet 158. Thus, if the source of current supply is a 60-cycle alternating current supply, the half-wave current pulsations being supplied to the electromagnet 158 will have a frequency of 60 cycles per second and the rate of vibration of the cutting tool 153 will likewise be 60 oscillations per second.

FIG. 19 shows the toolholder unit 151 being used with a current supply means for the electromagnet 158 by which current of a readily variable frequency can be supplied thereto for correspondingly varying the oscillation frequency of the cutting tool 153. The variable frequency current supply means here shown comprises a suitable oscillation generator 168 of a conventional form and a suitable amplifier 169 of a conventional form by which the selected output signal frequency of the oscillation generator can be amplified as needed before being supplied to the electromagnet 158.

The oscillation generator 168 is provided with a conductor cord 170 adapting the same to be connected with a suitable source of energizing current and also includes a manually operable control 171 by which the oscillation frequency or wave shape of the output signals can be varied, as desired and during the cutting operation, to suit the different vibration frequencies needed for the cutting tool 153. The oscillation generator 168 is connected with the amplifier 169 by a pair of conductors 172 and through a control switch 173 located in one of these conductors. The amplifier 169 is provided with a conductor cord 174 for energization of this unit from a suitable current source and operates to amplify the output signals of the oscillation generator 168 and supply the same as either alternating current signals or pulsating direct current signals to the electromagnet 158.

FIG. 20 shows the vibratory toolholder unit 151 being used in connection with a lathe or the like having a rotatable work spindle or chuck 176 for rotating the workpiece 150 in engagement with a cutting tool 153 which is controlled, as to its vibratory movement, by signalling means connected with the electromagnet 158 and here shown as comprising a pick-up unit 177 and an amplifier 169. The pick-up unit 177 co-operates with indicator means which provides indications with respect to the characteristics of the vibratory cutting action to be performed by the tool 153 and which indicator means can be of any suitable type and is here shown in the form of a rotatable drum 178 carrying appropriate indicia patterns and rotatably driven from the work spindle 176 in a timed relation thereto. The drum 178 is also shiftable in timed relation to the feeding movement of the toolholder unit 151 to cause the different indicia patterns to become effective for controlling the cutting operations of the tool 153 on the different workpiece portions.

The indicator drum 178 is here provided with four different indicia patterns 178a, 178b, 178c and 178d on the periphery thereof and which are representative of different operating actions desired for the tool 153 with respect to different portions of the workpiece 150. The indicia pattern 178d is a solid annular band of a dark color or non-reflective character extending around the drum 178 and provides a cut-off pattern, as further explained hereinafter, for interrupting or stopping the vibratory movement of the tool 153. The indicia patterns 178a, 178b and 178c are also annular bands extending around the drum 178 but each of these three patterns is of a predetermined form or design which has been established or arrived at as by calculations, measurements, test observations or readings, or various other such procedures, so as to be representative of, and provide a control function for, the cutting action of the tool 153 on the different workpiece portions 150a, 150ᵇ and 150ᶜ with respect to the vibratory movement of the tool.

The indicia pattern 178ᵃ controls the vibratory movement of the tool 153 for the cutting operation performed on the workpiece portion 150ᵃ and comprises recurring light and dark areas of a relatively fine-pitch spacing.

The pattern 178ᵇ controls the vibratory movement of the tool 153 during the cutting operation on the workpiece portion 150ᵇ and is an annular band similar to that of the pattern 178ᵃ but whose light and dark areas are of a somewhat larger size and wider spacing and can be referred to as a recurring pattern of intermediate pitch spacing. The pattern 178ᶜ controls the vibratory movement of the tool 153 during the cutting operation thereof on the workpiece portion 150ᶜ and is a recurring pattern similar to the patterns 178ᵃ and 178ᵇ but of a relatively coarse-pitch spacing.

The drum 178 is fixed on a shaft 179 which is rotatable and axially shiftable in suitable bearings 179ᵃ and 179ᵇ and has a splined portion 179ᶜ extending through the hub of a pulley 180ᵃ. The drum is rotatably driven in timed relation to the workpiece 150 by a belt 180ᵇ extending around the pulley 180ᵃ and connecting the same with a drive pulley 180ᶜ. The pulley 180ᶜ is mounted on a shaft 180ᵈ which is driven from the work spindle 176 as by means of co-operating spiral bevel gear members 176ᵃ and 176ᵇ. While the drum 178 is being thus driven from the work spindle 176, it will be axially shiftable with the shaft 179 to locate a selected one of the indicia patterns in a scanning position relative to the pick-up device 177 to be read by the latter.

The axial shifting of the drum 178 in one direction is produced by a program cam appropriate for the workpiece 150 and which is here shown as being a cam bar 181 connected with the adjacent end of the shaft 179 as by a thrust bearing 182. The drum is axially shiftable in the opposite or return direction by a compression spring 180 effective against the other end of the shaft 179. The cam bar 181 is subject to, and shiftable by, the thrust of a cam follower 183 thereagainst as the tool 153 is moved along the workpiece 150 by the longitudinal feeding action imparted to the toolholder unit 151. The cam follower 183 is suitably attached to the mounting plate of the toolholder unit 151.

The cam bar 181 has cam portions or contours corresponding with the different workpiece portions and here shown as dwell portions 181ᵃ, 181ᵇ and 181ᶜ of different heights and corresponding in length and offset dimensions with the respective workpiece portions 150ᵃ, 150ᵇ and 150ᶜ. As the tool 153 is moved along the workpiece 150, the follower 183 will accordingly act against the dwell portions 181ᵃ, 181ᵇ and 181ᶜ to impart appropriate axial movement to the drum 178 for locating the proper or selected indicia pattern in the scanning position.

The workpiece 150 is here shown as being of the kind in which the portions 150ᵃ, 150ᵇ and 150ᶜ are cylindrical portions and in which shoulder portions 184ᵃ and 184ᵇ occur between the adjacent ends of these cylindrical portions. The cam bar 181 also has cam lobes 185ᵃ and 185ᵇ of suitable height thereon which are located between the adjacent ends of the dwell portions 181ᵃ, 181ᵇ and 181ᶜ and are spaced apart to correspond with the longitudinal spacing of the shoulder portions 184ᵃ and 184ᵇ of the workpiece. During the feeding movement of the tool 153 along the workpiece 150 the cam lobes 185ᵃ and 185ᵇ are engageable by the follower 183 as a detecting means for detecting the arrival of the tool at the shoulder portions 184ᵃ and 184ᵇ and for causing the vibratory movement of the tool 153 to be interrupted or discontinued while the tool is operating on the shoulder portions.

The pick-up unit 177 can be of any suitable type and is here shown as being of the optical type having a lamp 186 as a light source energized from a suitable source of current through a conductor cord 187 and which supplies light to the selected one of the indicating patterns of the drum 178 through a suitable lens or the like 188. Light reflected from the selected or effective pattern is supplied to a light responsive device or cell 189 of the pick-up unit 177 through a suitable lens or the like 190. The amount of light received by the light-sensitive device 189 from the selected pattern of the drum 178 will vary in accordance with the reflectiveness of the light and dark areas of such pattern when the selected pattern is of the recurring type and the electric output signals of this device will vary correspondingly. When the selected pattern is the continuous dark band 178ᵈ there will be no appreciable light reflection, and consequently, the pick-up unit 177 will then produce no output signals. The output signals of the pick-up unit 177, when produced, are supplied to the electromagnet 158 through the amplifier 169.

The control function provided by the pick-up unit 177 can be used continuously or intermittently as desired during the cutting operation performed by the tool 153 by appropriately closing or opening a control switch 191 located in one of the circuit conductors 192 which connect the pick-up unit with the amplifier. When the tool 153 is being vibrated by the electrohydraulic vibration generator 152 under the control of the pick-up unit 177 as explained above, the machining of the workpiece 150 will be carried out in an accurate and faithful manner in accordance with the predetermined desired characteristics represented by the selected control pattern being scanned or read by the pick-up unit.

The position of the toolholder unit shown in FIG. 20 is with the tool 153 in cutting engagement with the workpiece portion 150ᵇ, and accordingly, the cooperation of the follower 183 with the dwell portion 181ᵇ has located drum 178 with the intermediate-pitch indicia pattern 178ᵇ in the scanning position as the selected pattern. At this time the output signals being produced by the pick-up unit 177 are controlling the vibratory movement of the tool so that the wave form of the cutting path on the workpiece portion 150ᵇ will be that called for by the selected or effective indicia pattern 178ᵇ.

When the fine-pitch pattern 178ᵃ is in the scanning position by reason of the cooperation of the follower 183 with the dwell portion 181ᵃ, the cutting path of the tool 153 on the work-piece portion 150ᵃ will be in accordance with the wave form called for by this indicia pattern. Similarly, when the coarse-pitch pattern 178ᶜ is in the scanning position by reason of the cooperation of the follower 183 with the dwell portion 181ᶜ, the cutting path of the tool 153 on the workpiece portion 150ᶜ will be in accordance with the wave form called for by this indicia pattern.

As the machining of the workpiece 150 progresses, the cam lobes 185ᵃ and 185ᵇ are engaged by the follower 183 when the tool 153 arrives at the shoulder portions 184ᵃ and 184ᵇ respectively. Whenever the follower is in cooperating engagement with one or the other of the cam lobes 185ᵃ and 185ᵇ, the drum 178 will be shifted to the position in which the solid dark indicia band or pattern 178ᵈ is in the scanning position relative to the pick-up unit 177. At this time there will be no signals produced by the unit 177, and consequently, the vibratory movement of the tool 153 will be discontinued and will remain interrupted while the follower is in engagement with one of the cam lobes.

Figure 22:
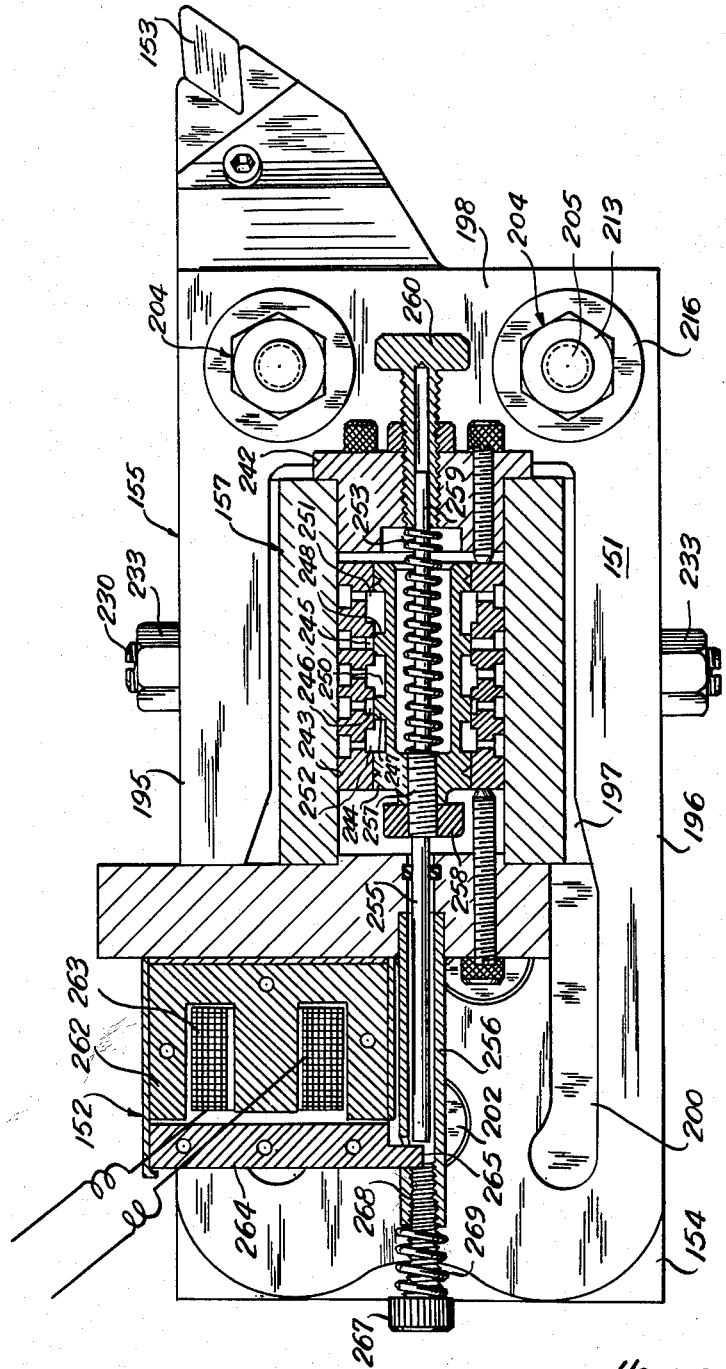
FIG. 22 is a sectional view taken through the magnet and valve means of the vibratory toolholder of FIG. 21 as indicated by section line 21—21 thereof.
Figure 23:
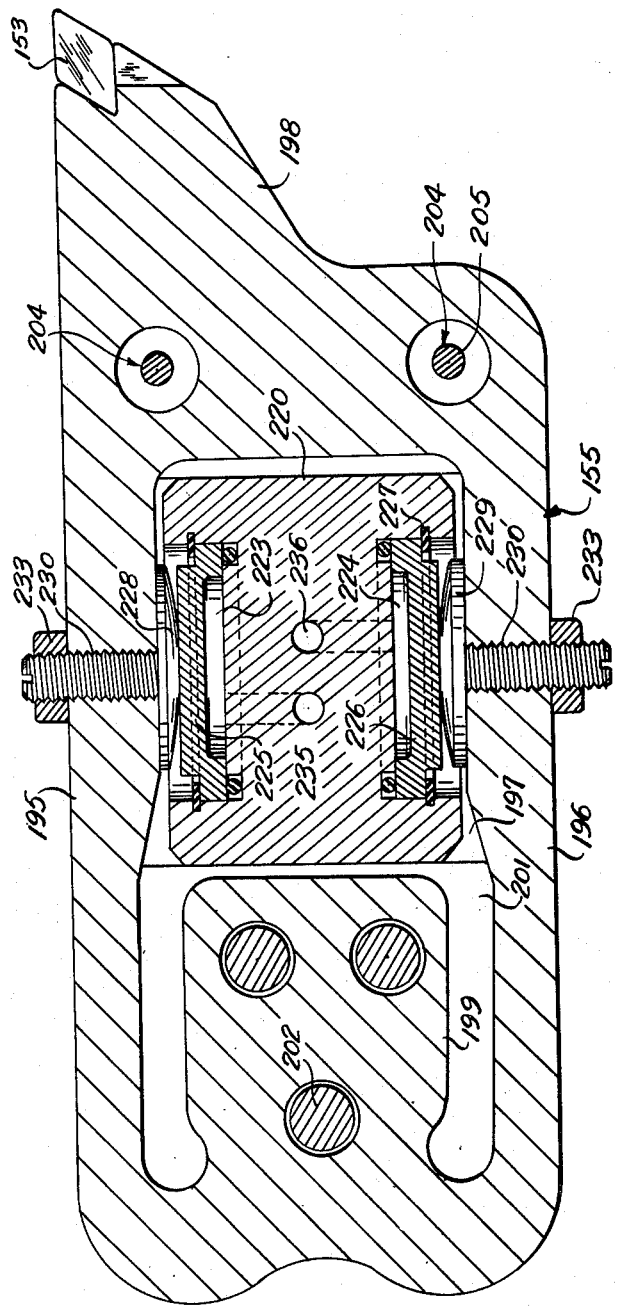
FIG. 23 is another sectional view taken through the vibratory toolholder of FIG. 21 as indicated by section line 23—23 thereof.

The electrohydraulic vibration generator 152 and the toolholder unit 151 of which it forms a part will now be described in greater detail and with reference to FIGS. 21, 22 and 23 of the drawings.

The head 155 of the toolholder unit 151 is a yoke-shaped member having spaced parallel resilient arms 195 and 196 lying on opposite sides of a recess 197 and extending in a longitudinal direction away from a tool mount portion 198 on which the cutting tool or tool bit 153 is mounted. The head 155 also has an attaching portion 199 located in the recess 197 and with which the remote ends of the parallel arms 195 and 196 are connected. The attaching portion 199 is rigidly attached to an elevated portion 200 of the mounting plate 154 which is adapted to be connected to the appropriate portion of a compound slide 29 similar to that shown in FIG. 1. The attaching portion 199 is secured to the mounting plate 154 as by suitable clamping screws 202 so that when the head is thus mounted on the plate 154, the arms 195 and 196 and the tool mount portion 198 are spaced above the plate by an intervening space 203 and will be capable of a limited vibratory movement relative to the plate.

The tool mount portion 198 is flexibly supported on the mounting plate 154 as by means of a pair of laterally spaced flexible mounts 204 provided by flexible studs 205. As shown in FIG. 21, these studs each have a shouldered and threaded lower end portion 206 attached to the mounting plate 154 and a flexible stem portion 207 extending into and along a passage 208 of the head 155. The stud 205 has a shouldered and threaded upper end portion with which the head 155 has a supporting connection established through a leveling screw 211, a support cap 212 and a clamping nut 213. The leveling screw 211 has a threaded connection 214 with the head 155 at the upper end of the passage 208 and seats against an upper support shoulder 215 of the stud 205. The clamping nut 213 cooperates with a threaded portion 216 of the stud to clamp the cap 212 against the head 155 to thereby press the leveling screw 211 against the upper support shoulder 215 of the stud.

From the construction just described for the flexible connections 204, it will be recognized that these connections support the tool mount portion 198 of the head 155 in a manner to permit the desired vibration of the tool mount portion and the cutting tool 153 in a horizontal vibration plane. It will also be recognized that the leveling screws 211 provide for adjustment of the flexible connections 204 for positioning the tool mount portion 198 and the tool 153 in the desired relation to the mounting plate 154.

The tool or tool bit 153 can be attached to the tool mount portion 198 by any appropriate clamping means and one suitable form of such a clamping means is here shown as comprising a clamping member or jaw 218 adapted to be tightened against the tool bit by a clamping screw 219.

The vibration generator 152 comprises, in addition to the valve device 157 and the electromagnet 158, a reaction block 220 located in the recess 197 of the head 155 and secured to the mounting plate 154 by a group of screws 221. The reaction block 220 is preferably also secured to the compound slide 29 by a second group of screws 222. This reaction block contains a pair of aligned cylinders 223 and 224 containing diaphragm-type flexible pistons 225 and 226 which supply the power for the vibratory flexing of the arms 195 and 196.

The pistons 225 and 226 are retained in their respective cylinders as by means of suitable snap rings 227 and have their diaphragm portions in force transmitting cooperation with thrust buttons 228 and 229 having threaded stems 230 engaged in and extending through threaded openings of the arms. The outer ends of the stems 230 are slotted for the application of an adjusting tool thereto whereby the stems can be rotated in the threaded openings for adjustment of the buttons relative to the pistons. The screws 232 are provided with lock nuts 233 by which the buttons can be locked in the desired position of adjustment.

The reaction block 220 has fluid passages 235 and 236 therein which communicate with the cylinders 223 and 224 respectively for supplying pressure fluid to, and exhausting fluid from, these cylinders. The hydraulic pressure is supplied to the cylinders 223 and 224 in the form of pressure pulsations by the operation of the valve device 157, which will be described hereinafter, and is supplied to the cylinders alternately. Thus, when pressure is supplied to the cylinder 223 through the passage 235, the diaphragm piston 225 will be moved or flexed in an outward direction to thereby flex the arm 195 of the head 155 in a corresponding outward direction. When the pressure fluid of the cylinder 223 is relieved through the passage 235, the resilient character of the arm 195 causes the same to be moved in an inward direction to impart a return movement to the piston 225 through the associated thrust button 228. While the fluid pressure of the cylinder 223 is being relieved, a pressure fluid impulse will be supplied to the cylinder 224 through its connecting passage 236.

The arms 195 and 196 will thus be flexed alternately at a rate corresponding with the rate of hydraulic fluid pressure pulsations supplied to the cylinders 223 and 224 and will result in a rapid vibratory swinging or vibration of the tool mount portion 198 and of the cutting tool 153.

The valve device 157 of the vibration generator 152 comprises a housing 238 in the form of a block secured to the reaction block 220 by suitable attaching screws 239 and having a through bore 240 which is closed at opposite ends by cover members 241 and 242. The valve device 157 also comprises a ported valve sleeve 243 located in the bore 240 and a valve plunger or spool 244 reciprocably slidable in the sleeve.

The sleeve 243 is provided with a pair of axially spaced internal annular ports 245 and 246 which are continually in communication with the cylinder passages 235 and 236 respectively and are controlled by a pair of annular valve elements 247 and 248 carried by the spool 244. Cooperating portions of the sleeve 243 and the spool 244 also form annular valve chambers 250, 251 and 252, of which the chamber 250 is an intermediate chamber and the chambers 251 and 252 are end chambers located on opposite sides of the intermediate chamber. The intermediate valve chamber 250 is a pressure inlet chamber for the cylinders 223 and 224 and is continuously supplied with hydraulic fluid of a suitable pressure value through the supply conduit 159. The end chambers 251 and 252 are exhaust chambers for the cylinders 223 and 224 and are connected with the exhaust conduit 160.

From the construction described above for the valve device 157 it will be recognized that when the spool 244 is moved axially toward the left in FIG. 21, the annular port 245 will be partially uncovered by the valve element 247 to thereby place the intermediate pressure inlet chamber 250 in communication with the cylinder 223 through the annular port 245 and the passage 235. This same movement of the spool toward the left will cause the annular port 246 to be partially uncovered by the valve element 248 to thereby connect the cylinder 224 with the exhaust chamber 252 through the annular port 246 and the passage 236. Similarly movement of the spool toward the right will cause the cylinder 224 to be connected with the pressure inlet chamber 250 and the cylinder 223 to be connected with the exhaust chamber 251.

The valve spool 244 is provided with an axially extending stem 255 which extends through a passage of the cover 241 into a sleeve extension 256 thereof which is located adjacent the electromagnet 158. An adjustable connection between the spool 244 and the stem 255 is provided by a threaded connection 257 therebetween and a lock nut 258 associated with this threaded connection. An adjusting and valve return spring 253 received in a recess of the spool 244 surrounds an extension portion 259 of the stem 255 and is engaged by an adjusting screw 260 which is threadedly mounted in the cover 242.

The electromagnet 158 is suitably mounted on the cover 241 of the valve housing 238 and comprises a core 262 and an energizing coil 263. This electromagnet also includes an armature 264 movable relative to the core 262 and having an actuating finger 265 cooperable with the stem 255 for actuating the valve spool 244. The finger 265 projects into the sleeve 256 at a point adjacent the outer end of the stem 255 so that when the armature 264 is moved toward the core 262 in response to energization of the coil 263, the finger will engage the end of the stem 255 and will move the spool 244 toward the right in opposition to the spring 253 to thereby shift the spool in a direction to admit pressure fluid to the cylinder 224 and exhaust fluid from the cylinder 223. When the coil 263 is de-energized, the spring 253 will return the spool 244 to an initial position to cause fluid pressure to be supplied to the cylinder 223 and the fluid of the cylinder 224 to be exhausted.

It will accordingly be seen that each time that the coil 263 is energized, the valve spool 244 will be shifted by the action of the finger 265 of the armature against the stem 255 to cause pressure fluid to be supplied to the cylinder 224 for flexing the arm 196 and, upon each return movement of the spool by the spring 253, pressure fluid will be supplied to the cylinder 223 for flexing the arm 195. Therefore, when the energization of the coil 263 is produced by alternating current the valve spool 244 will be actuated with a frequency equal to twice the frequency of the energizing current to cause the pistons 223 and 224 to vibrate the tool bit 153. When the energizing current is a pulsating direct current the rate of actuation of the valve spool will be the same as the frequency of the pulses of the pulsating current. A desired frequency of vibration for the tool bit 153 can thus be achieved by controlling or varying the frequency characteristic of the energizing current for the electromagnet 158.

The retracted position for the armature 264 and the retracted position to which the valve spool 244 is movable by the return spring 253 can be determined by an adjusting screw 267 having its stem engaged in a threaded portion 268 of the sleeve 256. The screw 267 can be maintained in a desired position of adjustment relative to the sleeve 256 by a compression spring 269 located between the head of this screw and the outer end of this sleeve. Likewise, by adjustment of the screw 260 the loading of the spring 253 and the action thereof against the spool 244 can be varied as needed.

The toolholder unit 151, which is described above and used in the embodiments illustrated in FIGS. 17 to 24 inclusive, is similar to the toolholder unit of FIG. 12 in one important respect in that the vibration generator is connected between the flexible portions or arms 195 and 196 and thus provides for a positive vibration of the head 155 at any desired frequency and which may be a resonant frequency or a nonresonant frequency.

FIG. 24 shows the above-described vibratory toolholder unit 151 being used in a lathe 290 for vibrating the cutting tool or bit 153 while the latter is in cutting engagement with an end face 291 of a rotatable workpiece 292 mounted in a chuck 290a and having a rotation axis 293. This view is related to the diagrammatic views of FIGS. 8 and 9 because it illustrates the position of the tool 153 relative to the rotation axis of the workpiece for a desired cutting operation but shows the tool extending in a direction substantially parallel with the rotation axis instead of transverse thereto. The tool 153 has a feed movement toward or away from the rotation axis 293 as indicated by the arrow 294 and produced by the handwheel 295 of the compound slide 296.

In the cutting operation illustrated in FIG. 24 the cutting path of the tool 153 on the workpiece 292, is again, a spiral path lying in the plane of the end face 291, and the direction of the vibratory movement of the tool is transverse to the cutting path and transverse to the axis of the tool itself, as indicated by the arrow 297. The vibratory movement of the tool is thus also in a direction transverse to the rotation axis 293.

Figure 25:
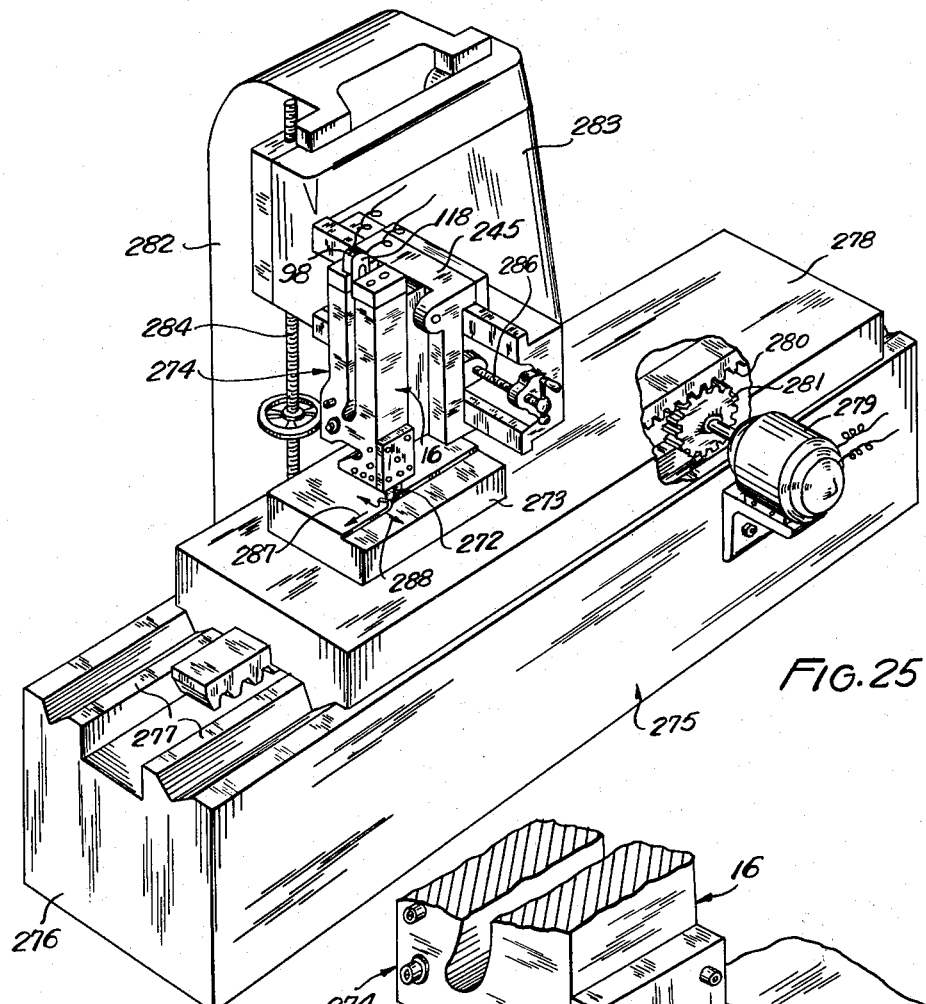
FIG. 25 is a perspective view showing a planer type of machine having the vibratory toolholder of this invention applied thereto.
Figure 26:
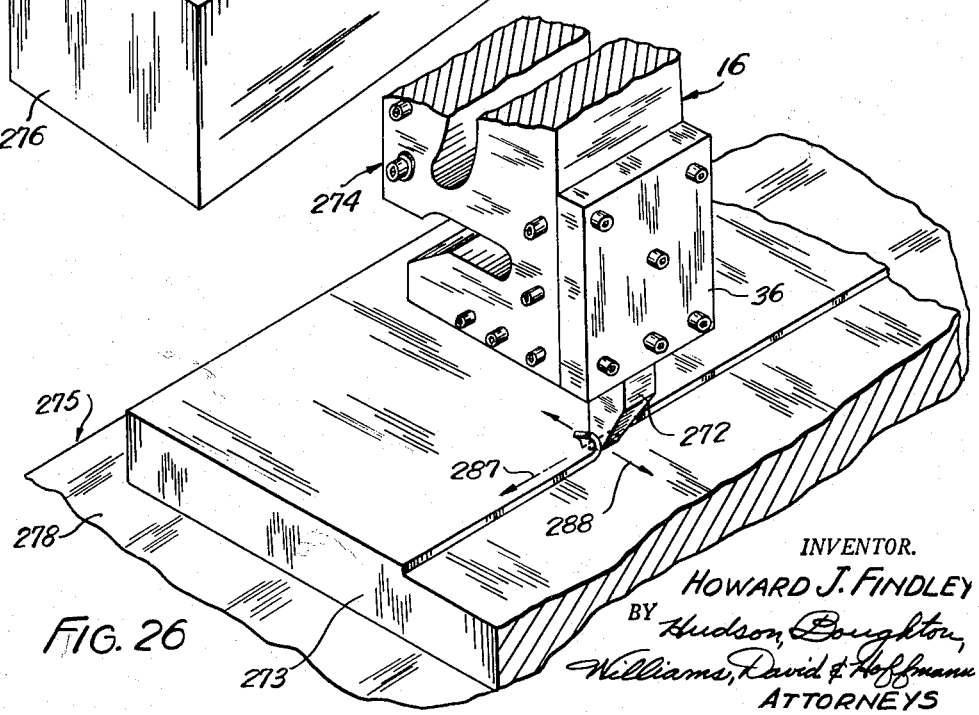
FIG. 26 is a perspective view on a larger scale corresponding with a portion of FIG. 25 and further illustrating the cutting action of the tool and the direction of the vibratory movement thereof.

FIGS. 25 and 26 of the drawings show the vibratory apparatus and method of this invention being used in a material removal operation of the kind employing a relative reciprocating movement between a tool 272 and a workpiece 273 engaged thereby. The tool 272 is a cutting tool forming a part of a toolholder unit 274 which is here shown as embodied in a planer 275 of an otherwise conventional form.

The planer 275 comprises a base 276 having ways 277 supporting a work table 278 for reciprocating movement relative to the workholder unit 274. The table 278 supports the workpiece 273 and is driven as by means of an electric motor 279 connected therewith by cooperating rack and pinion members 280 and 281. The planer 275 also includes an upright frame portion or bracket 282 rising above the base 276 and supporting a toolhead 283 for vertically slidable movement by an upright feed screw 284. The toolhead 283 includes a transversely movable slide 285 on which the toolholder unit 274 is suitably mounted and which slide is actuatable by a transverse feed screw 286.

The toolholder unit 274 is here shown as having a vibratory head 16 of the same form as the head of the toolholder unit 11 described above but the vibration generator of the toolholder unit 274 is shown as being an electromagnetic generator 98 of the form illustrated in FIG. 13. The head 16 of the toolholder unit 274 is vibrated by the generator 98 whenever the magnet coil 118 thereof is energized, to thereby produce a vibratory movement of the cutting tool 272 in the same general manner as has been described above for the cutting tools 10 and 153.

In the operation of the planer 275, the workpiece 273 is moved back and forth by the table 278 while engaged by the cutting tool 272 so as to produce a traversely cutting movement of the tool relative to the workpiece and along a cutting path extending in the direction indicated by the arrow 287. The vibratory movement transmitted to the tool 272 by the head 16 is in a direction transverse to the axis of the tool and transverse to the cutting path, as is indicated by the directional arrow 288. The vertical feed screw 284 provides for an initial setting of the tool 272 relative to the workpiece 273 and the transverse feed screw 286 provides for increments of feeding movement to be imparted to the tool for the successive cutting excursions thereof.

The cutting operation performed on the workpiece 273 by the tool 272 will be substantially the same as the cutting operations performed by the tools 10 and 153 with respect to the beneficial results achieved from the vibratory action of the cutting tool.

In describing herein the vibratory movement imparted to the tool, reference has been made mainly to the oscillation frequency of the vibratory movement and to the control of the vibratory movement by varying the oscillation frequency. It should be understood, however, that, if desired, the amplitude of the vibratory movement of the tool can likewise be controlled or varied. This can be done by merely varying the power output of the vibration generators used in the various different forms of the vibratory apparatus disclosed herein. It will now also be recognized that in all of the various forms of vibratory apparatus disclosed herein the direction of the vibratory movement imparted to the tool is transverse to the path of the cutting movement of the tool.

In all of the vibratory toolholder units disclosed herein the wave form representing the vibratory cutting path of the tool can be controlled or varied by controlling or varying the wave form of the power input to the vibration generator. The wave form of the cutting path of the tool can accordingly be sinuous in shape as shown in FIGS. 10 and 11 or can assume the shape of any one of an infinite number of nonsinuous or irregular curves. When a certain wave form has been determined to be needed for the cutting path of the tool to produce a desired result on the workpiece, the power input to the vibration generator is varied to achieve the wave form of the power input which will produce that desired result.

Thus in the use of the toolholder unit 97 of FIG. 12, for example, the wave form of the cutting path of the tool can be varied as desired by varying the wave form of the power input curve representing the pulsating pressure fluid supply to the vibration generator 102. Similarly for the toolholder units 98, 151 and 274, the wave form of the cutting path of the tool can be varied as desired by varying the wave form of the power input curve representing the supply of energizing current to the electromagnets 118 and 158.

From the accompanying drawings and the foregoing detailed description it will now be readily understood that this invention provides a novel method and apparatus for the removal of material from a workpiece by cutting or machining, or other such procedures, in a highly effective manner as the result of a rapid vibratory movement of the tool or tools during the material removing or cutting operation. Since many of the important advantages resulting from the vibratory apparatus and method of this invention have already been mentioned hereinabove, they need not be further summarized at this point.

Although the apparatus and method of this invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In the removal of material from a workpiece by turning thereof with a tool having a cutting tip; the method comprising the steps of rotating the workpiece in engagement with said tip to cause a continuous cutting traverse by said tip circumferentially of the workpiece; imparting a longitudinal feed movement to said tool parallel to the rotation axis of the workpiece so that said cutting traverse comprises successive cuts along adjacent coextending cutting path portions of a helically continuous cutting path during successive revolutions of the workpiece; vibrating said tip back and forth on a directional line substantially parallel to said feed movement; continuing the vibration of said tip during the cutting traverse; and controlling amplitude and frequency characteristics of the vibratory movement of the tip in relation to the rotative movement of the workpiece so that said adjacent cutting path portions are in an out-of-phase relation and the removed material comprises discrete chips.

2. In the removal of material from an endwise-facing portion of a workpiece by turning thereof with a tool having a cutting tip; the method comprising the steps of rotating the workpiece on an axis extending normal to the plane of said portion and with said portion in engagement with said tip to cause a continuous cutting traverse by said tip; imparting a transverse feed movement to said tool on a directional line transverse to the rotation axis so that said cutting traverse comprises successive cuts along adjacent coextending cutting path portions of a spirally continuous cutting path during successive revolutions of the workpiece; vibrating said tip back and forth on a directional line extending substantially parallel to said feed movement and transverse to the tool axis and transverse to said rotation axis; continuing the vibration of said tip during said cutting traverse; and controlling amplitude and frequency characteristics of the vibratory movement of the tip in relation to the rotative movement of the workpiece so that said adjacent cutting path portions are in an out-of-phase relation and the removed material comprises discrete chips.

3. In the removal of material from a workpiece by machining thereof with a tool having a shearing-action cutting tip; the method comprising the steps of producing relative longitudinal straight-line excursion movements between the workpiece and tool tip while in an engaged relation so that said tip traverses the workpiece along adjacent coextending longitudinal cutting paths during successive cutting excursions; vibrating said tip back and forth on a directional line transverse to the tool axis and transverse to the cutting excursion movement; continuing the vibration of said tip during the cutting excursion; and controlling amplitude and frequency characteristics of the vibratory movement of the tip in relation to the cutting excursion movement so that said adjacent cutting paths are in an out-of-phase relation and the removed material comprises discrete chips.

4. The method of removing material from a workpiece, having work portions comprising cylindrical portions on opposite sides of an endwise-facing shoulder portion, by turning thereof with a tool having a cutting tip; comprising the steps of rotating the workpiece with one of said cylindrical portions in engagement with said tip to cause a continuous cutting traverse by said tip circumferentially of said one cylindrical portion; imparting a longitudinal feed movement to said tool parallel to the rotation axis of the workpiece so that said cutting traverse of said one cylindrical portion comprises successive cuts along adjacent coextending cutting path portions of a helically continuous cutting path during successive revolutions of the workpiece; vibrating said tip back and forth on a directional line substantially parallel to said longitudinal fed movement; continuing the vibration of said tip during the cutting traverse thereof along the helical path; controlling amplitude and frequency characteristics of the vibratory movement of the tip in relation to the rotative movement of the workpiece so that said adjacent cutting path portions are in an out-of-phase relation and the material removed from said one cylindrical portion comprises discrete chips; and automatically interrupting the vibratory movement of said tip upon arrival thereof at said shoulder portion.

5. In apparatus for removing material from a workpiece by turning; a toolholder means including a turning tool having a cutting tip; workholder means operable to support a workpiece and rotate the same in engagement with said tip to cause cutting of the workpiece along a cutting path extending circumferentially thereof; feed means connected with said tool holder means and operable to produce a longitudinal feed movement of the tool substantially parallel to the rotation axis of the workpiece; power operated oscillation producing means on said toolholder means and effective to oscillate said tip during the cutting operation with a back and forth vibratory movement on a directional line extending parallel to said longitudinal feed movement and transverse to the circumferential cutting path to cause the cutting path to assume a wave form on the workpiece in accordance with the oscillation of said tip; power supply means connected with said oscillation producing means for supplying power medium thereto; and control means operable to control the power supply to said oscillation producing means to determine the characteristics of said wave form in relation to the rotative movement of the workpiece.

6. In apparatus for removing material from a workpiece by machining; workholder means adapted to support a workpiece; toolholder means including a tool having a cutting tip; frame means supporting said workholder means and said toolholder means for relative reciprocable movement therebetween with said tip in shearing engagement with the workpiece, and for cutting transverse of said tip in a direction longitudinally along the workpiece; drive means operable to produce said relative movement; and power operated oscillation producing means on said toolholder means and effective to oscillate said tip with a back and forth vibratory movement on a directional line extending transverse to the axis of the tool and transverse to the longitudinal cutting traverse.

7. The method of removing material from a workpiece by a rotative shearing action with a tool extending generally transverse to the rotation axis and having a cutting tip in engagement with the workpiece; comprising the steps of producing relative rotation between the workpiece and tool to cause a continuous cutting traverse by said tip circumferentially of the workpiece; producing a relative longitudinal feed movement between the workpiece and tool along the rotation axis so that said cutting traverse comprises successive cuts along adjacent coextending cutting path portions of a helically continuous cutting path during successive revolutions of the rotative movement; and vibrating said tool to cause back and forth oscillations of said tip along the direction of said longitudinal feed movement during said cutting traverse so that said adjacent cutting path portions are in an out-of-phase relation and the removed material comprises discrete chips.

8. The method of removing material from a workpiece as defined in claim 7 wherein the direction of the vibratory movement of said tool is also transverse to the axis of the tool.

9. The method of removing material from a workpiece as defined in claim 7 and which comprises controlling the vibration of said tool in relation to the rotative movement between the workpiece and tool for achieving the out-of-phase relation of said cutting path portions.

10. In apparatus for removing material from a workpiece by turning; a toolholder means including a turning tool having a cutting tip; workholder means operable to support a workpiece and rotate the same in engagement with said tip to cause cutting of the workpiece along a cutting path extending circumferentially thereof; feed means connected with said toolholder means and operable to produce a longitudinal feed movement of the tool substantially parallel to the rotational axis of the workpiece; said toolholder means comprising a yoke member having an end portion to which said tool is attached and a pair of spaced flexible arms connected at one end with, and projecting from, said end portion; power operated oscillation producing means connected with at least one of said arms and effective to impart movement thereto in the direction of the spacing of the arms for vibrating said arms and causing a back and forth vibratory movement of said tool during the cutting operation on a directional line extending parallel to the longitudinal feed movement and transverse to the circumferential cutting path to cause said cutting path to assume a wave form on the workpiece in accordance with the oscillation of said tip; and power supply means connected with said oscillation producing means for supplying power medium thereto.

References Cited by the Examiner
UNITED STATES PATENTS

| | | | |
|---|---|---|---|
| 1,292,494 | 1/19 | Lorenz | 82—1 |
| 2,044,497 | 6/36 | Schiltz | 82—1.4 |
| 2,127,523 | 8/38 | Kraus | 82—1.4 |
| 2,373,265 | 4/45 | Salisbury | 82—14.2 |
| 2,452,211 | 10/48 | Rosenthal | 82—916 |
| 2,510,544 | 6/50 | Basket | 82—36 |
| 2,553,251 | 5/51 | Gutterman | 310—26 |
| 2,632,353 | 3/53 | Montanus et al. | 82—14.2 |
| 2,634,646 | 4/53 | Clatfelter | 82—36 |
| 2,736,144 | 2/56 | Thatcher | 51—64 |

FOREIGN PATENTS

| | | |
|---|---|---|
| 22,195 | 8/12 | Russia. |
| 524,141 | 5/31 | Germany. |
| 654,872 | 12/37 | Germany. |
| 714,860 | 9/54 | Great Britain. |

WILLIAM W. DYER, Jr., *Primary Examiner.*

LEON PEAR, *Examiner.*